A. D. WILT, Jr.
STEERING REACH ROD.
APPLICATION FILED APR. 27, 1910.
1,195,122.
Patented Aug. 15, 1916.
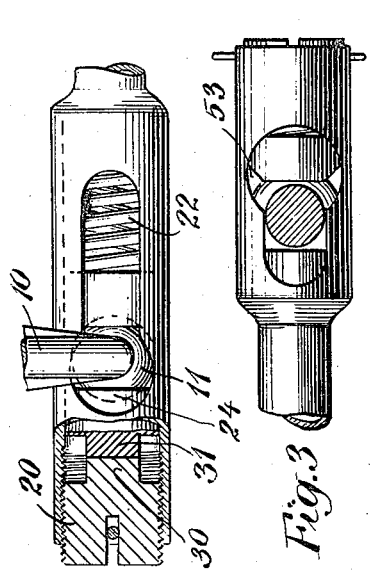
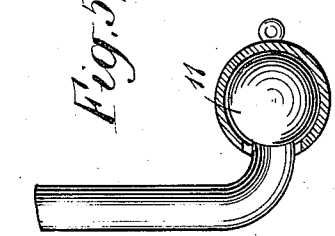
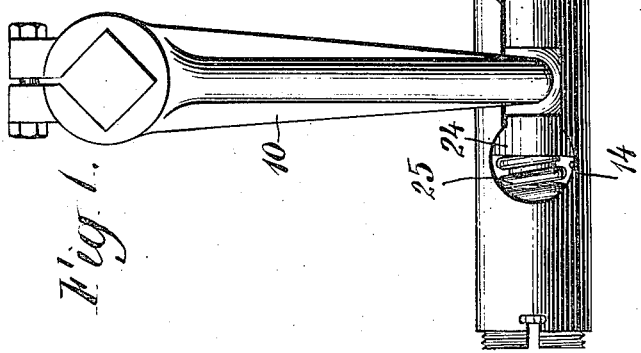
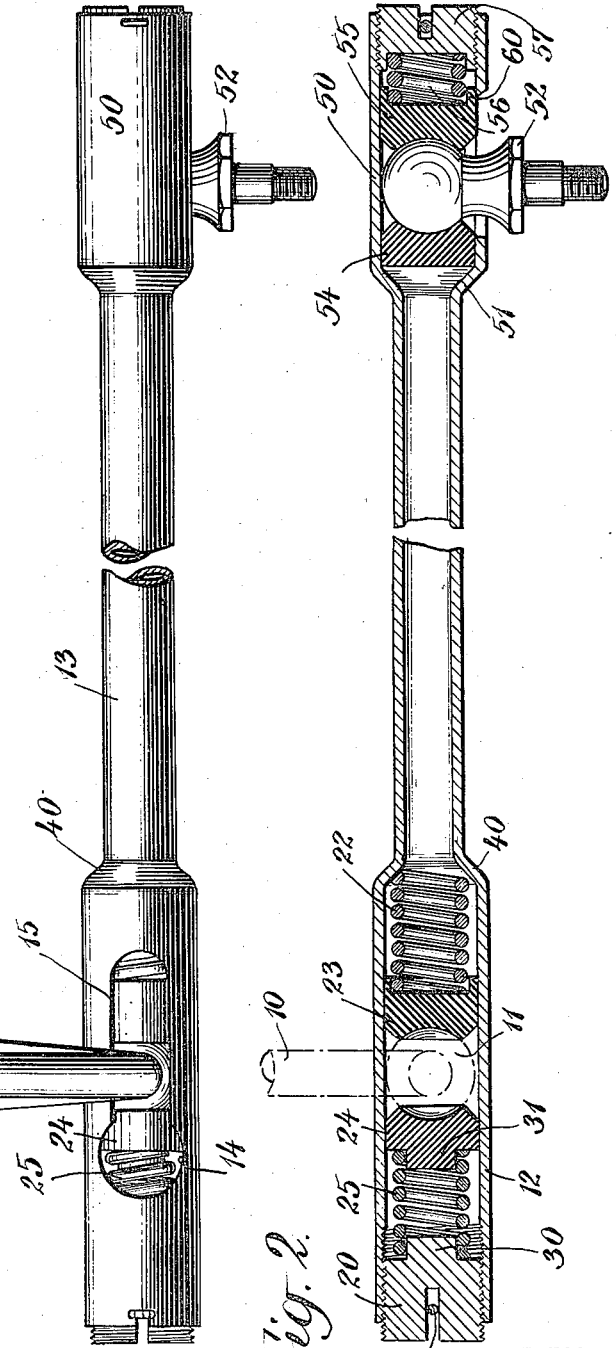
WITNESSES:
INVENTOR
BY
ATTORNEYS

UNITED STATES PATENT OFFICE.

ABRAM D. WILT, JR., OF DETROIT, MICHIGAN.

STEERING REACH-ROD.

1,195,122.  Specification of Letters Patent.  Patented Aug. 15, 1916.

Application filed April 27, 1910. Serial No. 557,969.

*To all whom it may concern:*

Be it known that I, ABRAM D. WILT, Jr., a citizen of the United States, residing at Detroit, in the county of Wayne and State of Michigan, have invented certain new and useful Improvements in Steering Reach-Rods, of which the following is a full, clear, and exact description.

This invention relates to an improvement in steering reaches or steering rod connections, more particularly as applied to motor vehicles such as automobiles; and has among its objects to provide a form of device of this sort which shall be simple and economical to manufacture, and at the same time shall minimize the dangers arising from breakage of certain parts of the steering mechanism, so that there can be no accidental displacement or separation of the parts on the breakage of certain intermediate springs. My invention can also be applied to radius rods and torsion rods as well as steering reach rods, but is especially applicable to the latter.

With these and incidental objects in view the invention consists in the novel combination of parts, a preferred form of embodiment of which is shown in the accompanying drawings forming part of this specification.

Of said drawings, Figure 1 is a side elevation of this improvement, showing a steering crank arm and the steering reach thereto connected; Fig. 2 is a sectional view of the parts shown in Fig. 1; Fig. 3 is a detail view of the bottom of the forward end of the reach; Fig. 4 is a detail view of the ball-arm in its tube socket; and Fig. 5 is a detail sectional view of the rear end of the reach illustrating the possible position of the parts upon breakage of one of the springs.

Referring to these drawings, 10 represents the steering crank arm or ball-arm which extends downward from the steering gear. This arm, as will be readily understood, is operated by a suitable steering wheel or other steering control device, in the usual and well known manner, swinging to the right and left in Fig. 1. On the end of this arm is carried the ball 11, which forms a ball and socket joint with the steering reach, in a manner to be presently described.

The steering reach comprises a tubular rod, which is a continuous piece of tubing from one end to the other, but is of smaller tubular diameter in its middle portion 13, as clearly shown in Figs. 1 and 2. This change in diameter is produced by swaging, with important advantages which will be set forth later.

The rear end of the steering reach rod (the left in Fig. 1) has its outer wall formed with an enlarged aperture 14, which is enough larger in diameter than the ball 11, to permit the ball to be inserted within the tube. An extended slot 15, connected with the aperture 14, permits the ball-arm to be shifted laterally in the tubing into positions such as shown in Figs. 1 and 2.

The rear end of the reach rod is closed by an adjustable plug 20 which is threaded into the tube, said plug being formed with a suitable slot 21 to permit turning of the plug in the threaded portion of the sleeve. This turning will advance or retract the plug for the purpose of reaching the desired adjustment as later explained. Before the plug 20 is inserted, an interior spring 22 is first put into the large portion 12 of the tube, and this is followed by a retaining block 23 which on the forward end seats against the spring 22, and on the left or rear side is made concave to fit the surface of the ball 11. Next the ball-arm is inserted into the aperture 14 and shifted to the right into contact with the retaining block 23, then a second retaining block 24 is inserted into the tube, then a spring 25, and finally the plug 20 is screwed into the end of the tubing, the parts assuming the positions shown in Figs. 1 and 2. When the crank arm 10 is swung back and forth by the steering gear, this reciprocates the steering reach to corresponding extent, the springs 22 and 25 yieldingly holding the ball-arm in place, and serving as intervening spring means to transmit the steering movement to the wheels.

When springs are thus used in steering reaches of this sort, and if the parts are assembled in a manner similar to that described above, by inserting the ball-arm into a socket in the steering reach, any breakage of the springs entails the serious danger of the ball-arm becoming disconnected from its socket, which of course would have disastrous consequences. To preserve this simplicity of assembling, and this spring transmission of the steering pressure, but at the same time to prevent such a fatal disconnecting of parts upon breakage of the springs, I have devised the following arrangement: It will be seen from Fig. 2 that the plug 20 is separated from the ends of the adjacent retaining block 24 by its spring 25 and by intervening free space, and that a projection 30 extends inwardly from the plug 20 toward said opposite retaining block 24. The extent of this projection is such as to obstruct said block 24 upon the breakage of the spring 25 sufficiently to bar the enlarged aperture 14 and prevent the ball from retraction therethrough. Fig. 5 gives an illustrative view of the positions of block 24 and block 20, assuming the spring 25 to have been broken or to be entirely absent. From this view it will be seen that the ball 11, shown in dotted lines, cannot be shifted to the left far enough to quite reach the aperture 14, as it would have to do to be disconnected therefrom. This therefore effectually prevents the ball-arm from being disconnected from its socket, even though spring 25 should break. Thus when the parts are assembled, the plug 20 is screwed into the tube to such an extent as to give the desired tension on the springs, but more particularly to be adjusted so that the projection 30 extends inward sufficiently to coöperate with the block 24 in the manner described, and thereby absolutely prevent disconnection of the ball-arm upon the breakage of the intervening spring. It will be apparent that a similar effect may be produced by having the projection extend from the block 24, such a projection 31 being in fact shown extending from said block in Fig. 2. But the projection from the plug 20 is the form which I prefer to adopt, and it is to be observed that the form of plug and projection shown in Fig. 2 has further advantages, namely, this projection 30 extends centrally from the plug and is of smaller diameter so as to permit a greater length of spring, if desired, but more particularly to obviate the necessity of threading too great an extent of the tube.

The difference in diameter of the tubing of the reach has been above referred to, and it will be seen from Fig. 2 that this arrangement affords material advantages. Instead of boring out the enlarged portion 12 of the tubing, a continuous piece of tubing, of uniform diameter, is taken, and by swaging process, the shoulder 40 formed, and the tube made of smaller diameter at the intermediate portion 13. This swaged shoulder 40 then serves as a shoulder to form the inner seat for the spring 22, and at the same time the reach rod preserves its character as a continuous piece of tubing, thereby having greater strength and being less expensive to make than by attempting to bore out the parts into the shape shown in Fig. 2.

From the above description of the parts at the rear end of the steering reach, the description of parts at the forward end will be readily apparent. The forward part 50 of the tubular rod, is of enlarged diameter, similar to the other end 12, with the swaged shoulder 51. The ball-arm 52, which extends to connections with the running wheels, is inserted through an aperture 53, and the ball-arm held in place by two retaining blocks, 54, 55, together with a spring 56 and an adjustable plug 57 threaded in the end of the tube. In this case the spring 56 is situated at the forward end of the reach, and in case of breakage of the spring, the ball-arm 52 is prevented from accidental retraction from the slot by reason of the cup-shaped form of the block 55. It will be seen from Fig. 2 that this form comprises the flange or rim 60 extending from the block 55 toward the plug 57, said plug having a similar flange or rim if desired. The extent of said projecting flange is such that when the plug 57 is properly adjusted, and the spring 56 is broken, the flange 60 will abut up against the plug 57 and in such position will overlap the aperture 53 sufficiently to prevent the retraction of the ball-arm.

What is claimed is as follows:

A connection comprising a ball arm, a tubular rod formed with an enlarged aperture therein to permit socketing of the ball and with an extended slot for the laterally shifting ball arm, a retaining block located within the tube and bearing against the ball; a spring adjacent said block for yieldingly holding the ball arm in place; an adjustable plug threaded in the tube at its outer end but separated from the adjacent retaining block by the spring and by intervening free space, and a projection on said plug extending toward said block, said block having a projection extending toward the projection on the aforesaid plug to an extent to abut against said projection on said plug upon breakage of the intervening spring sufficiently to cause the block to overlap said enlarged aperture, thereby preventing the ball from retraction therethrough.

In testimony whereof I affix my signature in the presence of two subscribing witnesses.

ABRAM D. WILT, Jr.

Witnesses:
MARVINE GORHAM,
JERRY B. CLARE.